Sept. 26, 1967
J. H. EDWARDS
3,343,715
HELIX BUN DISPENSER
Filed Sept. 7, 1965
4 Sheets-Sheet 2
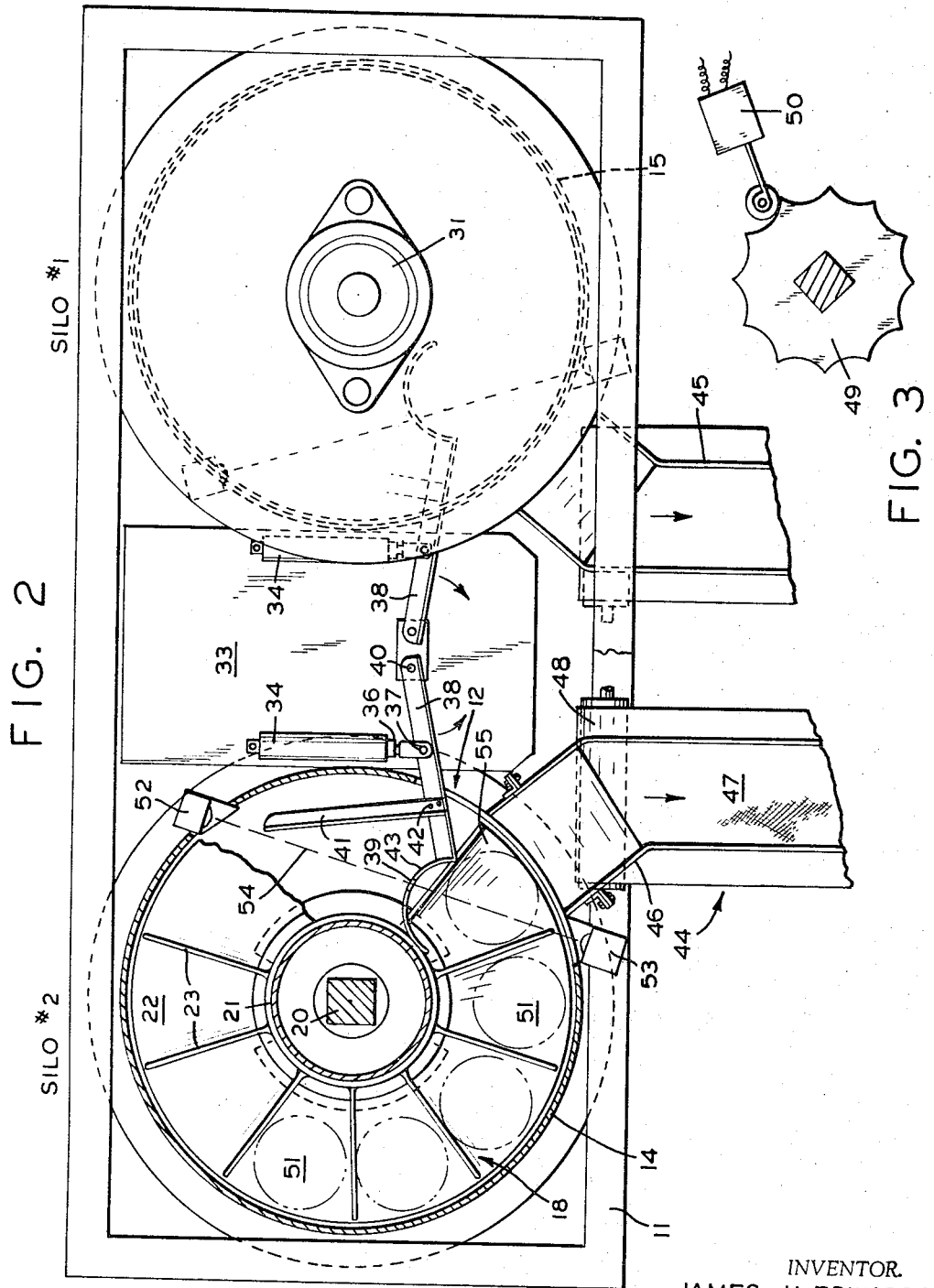
INVENTOR.
JAMES H. EDWARDS
BY
Arthur J. Plantamura
ATTORNEY.

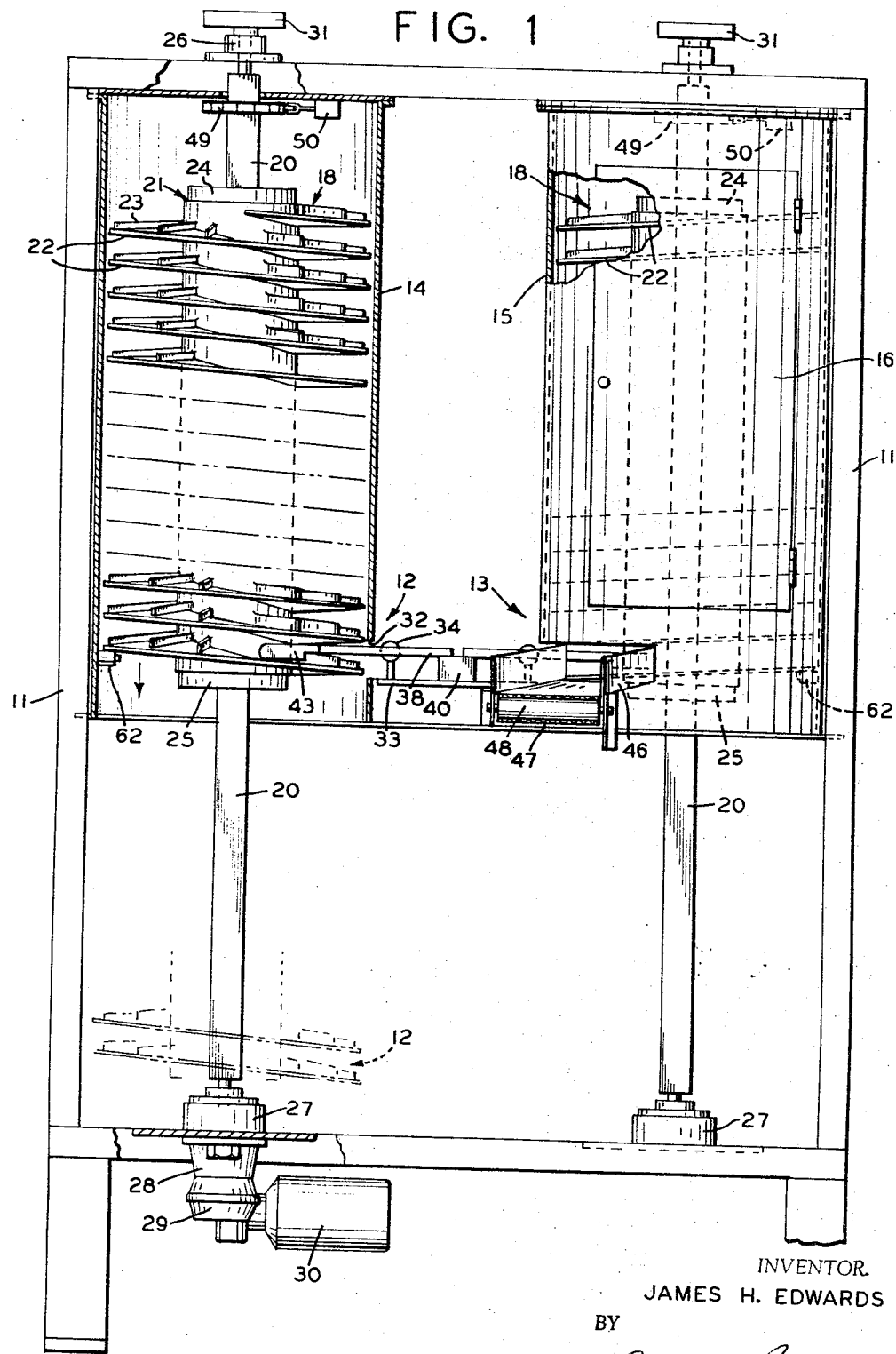

Sept. 26, 1967  J. H. EDWARDS  3,343,715
HELIX BUN DISPENSER

Filed Sept. 7, 1965  4 Sheets-Sheet 3

INVENTOR.
JAMES H. EDWARDS
BY
*Arthur J. Plantamura*
ATTORNEY.

INVENTOR.
JAMES H. EDWARDS

BY Arthur J. Plantamura
ATTORNEY.

United States Patent Office 3,343,715
Patented Sept. 26, 1967

3,343,715
HELIX BUN DISPENSER
James H. Edwards, Newtown, Conn., assignor to American Machine & Foundry Company, a corporation of New Jersey
Filed Sept. 7, 1965, Ser. No. 485,317
7 Claims. (Cl. 221—13)

This invention relates to dispensing apparatus and more particularly to a dispenser capable of storing items such as bread rolls and automatically dispensing the individual items therefrom on demand. To facilitate the description, the machine of the invention will be described in its function in connection with bread rolls such as the type employed in making hamburger sandwiches but it will be apparent to one skilled in the art that the apparatus may be usefully adapted to dispense other items as well.

In a more specific embodiment, the invention relates to an apparatus which may be combined with and form a part of a machine such as that described in the pending U.S. application of H. Udall et al., S.N. 220,615 which is capable of performing, fully automatically, all the functions of making a sandwich, i.e. storing, cooking, assembling, wrapping and dispensing.

Sandwich forming apparatus of this kind advantageously form a part of an automated system for preparing and dispensing articles of food ready for consumption by a customer. Also, because of its automatic features the apparatus, of which the invention forms a part, is capable of use with an automated restaurant system of the kind described in the U.S. patent application of Hadley et al., S.N. 267,530, for example, which includes a centrally located attended control station where orders for food items are received directly, or by telephone or microphone, or other voice communication device, such as may be found at drive-in restaurants. An automated restaurant of this kind operates through electronic ordering and billing equipment in conjunction with a variety of different food preparing machine which on demand cook and dispense food items which are then conveyed and assembled at a central location. An illustrative automated ordering and billing system of this kind is disclosed, for example, in the N. Alpert et al., pending U.S. application S.N. 219,222.

The bread roll dispensing apparatus of this invention is characterized by its reliable on-demand capability. The machine comprises an independently operable unit as distinguished from a continuous production machine so that even though one or more hours may elapse since a prior item has been dispensed, upon demand, it functions rapidly and reliably to dispense a single or an indefinite number of bread rolls. The machine is also characterized by its control features which are sequentially operable and perform a function from a single electrical impulse which synchronously triggers later functions.

It is an object of the present invention to provide a novel apparatus for storing items and automatically dispensing the items individually on demand.

It is a more specific object of the invention to provide a compact unit having automatic interchanging alternate storage compartments capable of storing substantial quantities of bread rolls and which may be refilled during use.

It is another object of the invention to provide an automatically operable apparatus which automatically delivers from storage an individual bread roll and slices and dispenses the sliced roll.

It is still another object of the invention to provide an apparatus which automatically dispenses rolls and which is adapted to accommodate tolerable variations in bread roll size while rejecting rolls which are at a substantial variance in dimensions.

It is still a further and more particular object of the invention to provide a self-contained, automatic bread roll dispensing unit which may readily be incorporated as a part of an electronic ordering and billing system so that upon remote command, the machine feeds individual bread rolls to sandwich assembly machine which in turn delivers the assembled sandwich to a central assembly station.

The above and other objects and features and advantages of the invention will be better understood from the following detailed description thereof when considered in conjunction with the accompanying drawing in which:

FIG. 1 is a front elevational view of the dispensing apparatus of the invention.

FIG. 2 is a plan view of the dispensing apparatus of the invention.

FIG. 3 is a detail taken along line 3—3 of FIG. 1 illustarting the rotating bun shelf registration element.

Figure 4:
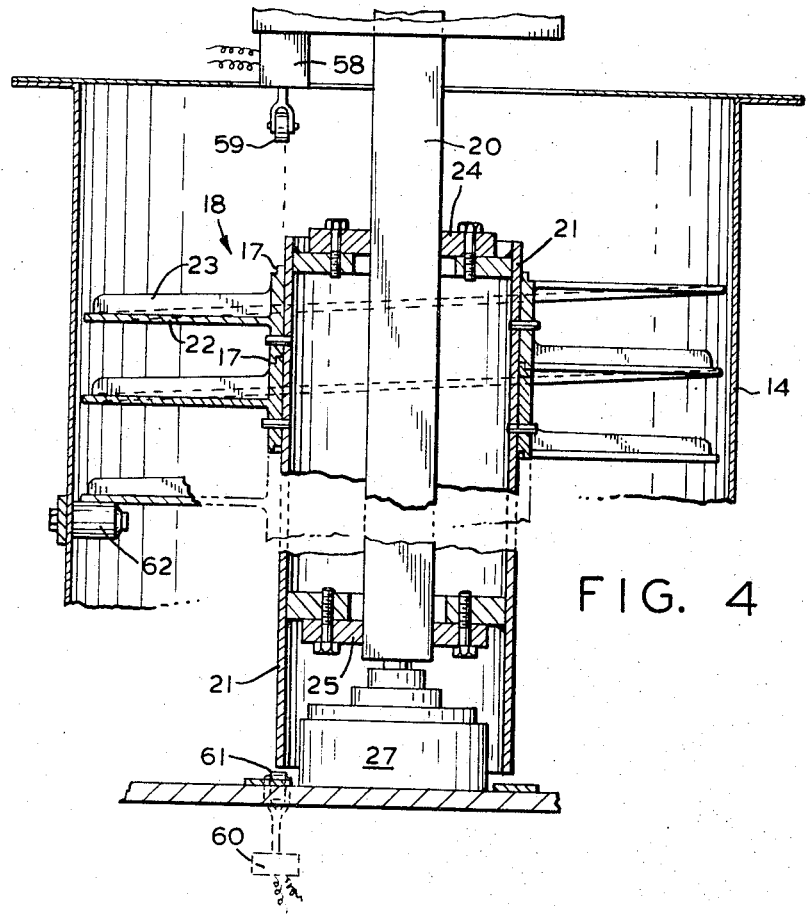
FIG. 4 is a sectional elevational view with parts cut away illustrating the arrangement for stacking the individual modular elements of the bun shelves which comprise the helical conveyor.
Figure 5:
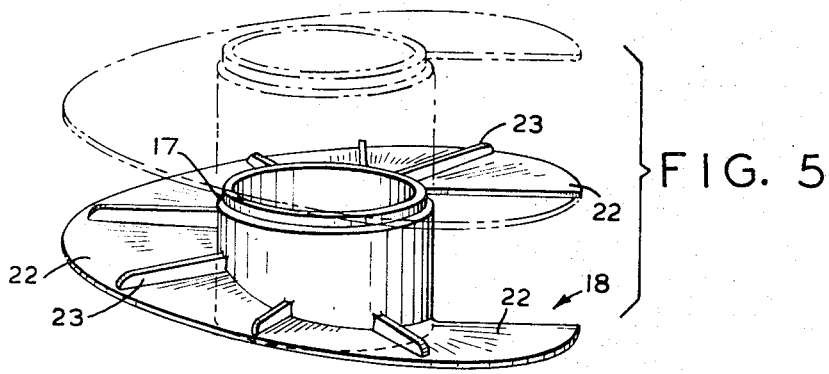
FIG. 5 is a perspective view showing one bun shelf module in solid lines and a second in phantom, mounted in relationship therewith.

In general the dispenser arrangement of the invention comprises a rotatable helical conveyor which accommodates on the flight thereof individual buns. The conveyor rotates intermittently in increments sufficient to present a single bun which is dispensed on demand. The apparatus is depicted with a pair of dispensers or silos which are operable in the alternate to provide a continuous supply i.e. when one unit is exhausted or malfunctions, transfer to the alternate unit takes place automatically after normal exhaustion, but transfer can be done manually at any time. It will be apparent, however, that the dispenser or silo units herein described may be used singly or, as depicted, in pairs.

Referring in particular to the drawing, the bun assembly consists of two sections or compartments, a right and a left silo or compartment, 14 and 15 respectively, each having an access door 16. These units, 12 and 13, are arranged so as to be essentially mirror images of each other, hence a description of the details of one unit will be understood to be descriptive, in essence of the other unit also. The compartments 14 and 15 include a helical member 18 which comprises a plurality of stacked bun shelves connected together in the form of a spiral. In the embodiment illustrated there are twelve decks in the assembly 18. It will be apparent, however, that any suitable number of such shelves may be suitably combined. Decks 22 are appropriately fitted together by a suitable interlocking overlap or groove arrangement 17 to provide a continuous flight on which the buns are borne. Bun shelf assembly 18 turns in the manner of a screw riding past a fixed reference point, i.e. roller element 62, three of which are provided.

The individual bun shelves 22, suitably interlocked against relative movement when stacked, are provided with upper and lower end adapters and bushings 24 and 25 which are equipped with openings which mesh with drive shaft 20. Shaft 20 depicted as a square in cross section, turns the flight decks 22 which are pinned or otherwise secured to a tube 21. Separators 23 form the stations for the individual buns. It is thus seen that as shaft 20 is rotated bushings 24 and 25 which are secured to central tube 21 also turn as does the flight 18 secured to tube 21. Flight 18 is suitably mounted in upper and lower bearing assemblies 26 and 27 and is driven by motor assembly 30 mounted at 28 through gearing 29. A friction drag brake 31 facilities the driving system. As the flight 18 comprising elements 22 rotates in unison, the rollers 62 act as a guide whereby the flight deck rolls either up or down. An opening 32 is provided contiguous to the bottom of each of the units 12 and 13 through which the buns are removed.

Removal of buns presented at the opening 32, is effected by a pivotal actuator assembly carried on the support 33. The bun transfer assembly includes an arm 38 suitably mounted pivotally at 40 on support 33 and actuated in its pivotal movement by the extension of rod 36 of a pneumatic cylinder 34. The piston rod 36 is connected at 37 to arm 38. Arm 38 at its free end is provided with a curved bun pusher position 43 and with a photocell light interrupter element or arm 41. A photocell 53 and light source 52 is preferably employed in the dispenser to detect the presence, at the dispensing position, of a bun. A beam 54 from light 52 is directed through an opening 39 in the bun pusher 43 and senses the presence or the absence of a bun 51. The photocell 53 receives beam 54 and rotates bun shaft 18 when bun 51 is not present adjacent exit chute 46. Photocell 53 does not receive beam 54 and does not rotate bun shelf 18 when bun 51 is present adjacent exit chute 46. Photocell 53 does not receive beam 54 and does not rotate bun shelf 18 when bun 51 is not present adjacent exit chute 46 during a bun transfer because an arm 41 interrupts beam 54 during the transfer operation. Photocell 53 is also coupled to cylinder 34 and prevents movement of cylinder 34 and pusher 43 while bun shelf 18 is rotating. When photocell 53 receives beam 54 and rotates bun shelf 18, photocell 53 restricts movement of cylinder 34 and pusher 43. When photocell 53 does not receive beam 54 and does not rotate bun shelf 18, photocell 53 does not restrict cylinder 34 and pusher 43.

Buns dispensed by arm 38 are diverted into a chute 46 which carries them to a take-away conveyor 44 which comprises a conventional endless belt 47 mounted for movement on support roller 48. Conveyor 47 may be arranged to carry the buns to a slicing device (not shown) of the kind described in the copending U.S. patent application of D. Holden, S.N. 273,065.

It is thus seen that in operation when the flight deck is in the upper position, door 16 may be opened. This affords access for loading, of approximately one-third of the bun pockets. After this section is loaded, the assembly is rotated a third turn so that the second portion of the dispenser can be loaded. Completion of restocking is effected by again turning the bun shelf 18 approximately one third revolution providing access to the remaining empty stations.

After the bun dispenser is rotated to the uppermost position as explained hereafter, it is then loaded and oriented so that the first bun comes in position and nearly touches pusher 43. As noted, pusher 43 is provided with an opening 39 so that the light beam 54 passing to the photo-electric cell 53 is interrupted as the bun is in the dispense positon. When this occurs the cell 53 signals the dispenser to stop rotating. In this manner, the buns are prevented from piling up. When properly energized and upon demand for buns, motor 30 turns the transmission or gear box 29 which in turn rotates the shaft 20 and the flight deck assembly 18 which moves up and down as motor 30 is energized in a forward or reverse direction, respectively. Arm 38 pushes buns off the bun tray 55 by an on demand signal and is moved forward or backward by cylinder 34. As the arm goes forward and back, the light beam going from photocell bulb 52 to pick up 53 is interrupted by interrupter arm 41. The interrupter arm 41 prevents the bun trays from rotating while the bun is being pushed out, in other words, when the bun is pushed out, if the interrupter arm did not intercept the light beam, there would be a signal indicating a clear path and this would initiate movement of bun shelf 18 so that the next bun would start moving into position. Unless this is precluded while the piston 34 is pushing out the first bun, a malfunction would be likely to result from the interferring or conflicting movements.

The segmented cam 49, in combination with switch 50 located at the top of the bun dispenser, as shown in FIG. 3, is used to guarantee registration of the pockets so that they will be properly aligned regardless of the bun shape. Upper switch 58, provided with contact 59, and lower switch 60, provided with contact 61, signals the stoppage of the drive motor for the upper and lower limits of the bun shelf assembly 18.

Figure 6:
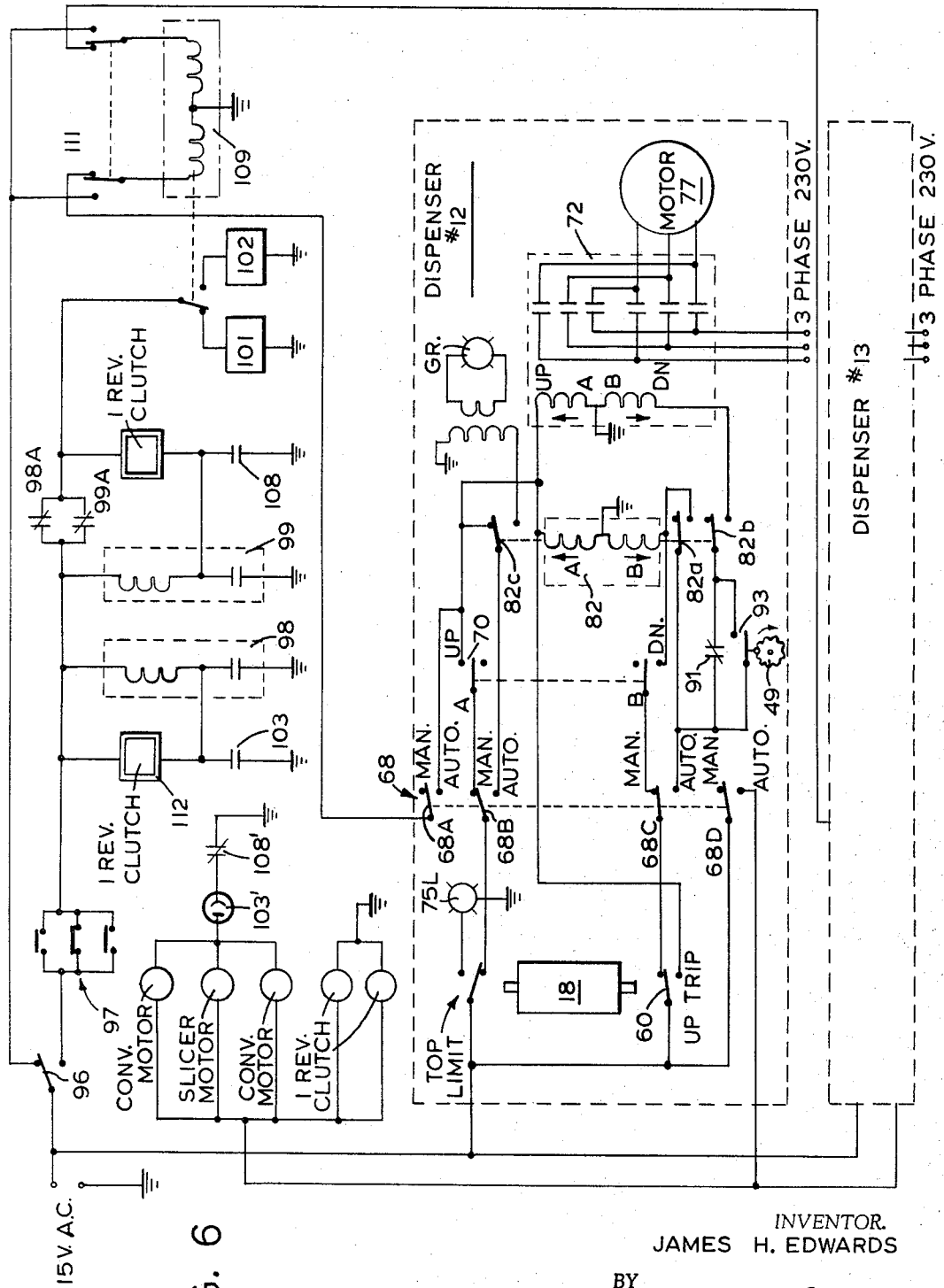
FIG. 6 is a wiring schematic for the dispensing apparatus of the invention.

Features of the dispenser of the invention will be further apparent by reference to the wiring diagram of FIG. 6. Inasmuch as the units 12 and 13 are essentially similar, reference in the wiring diagram will be made to components of dispenser 12, it being apparent that details of "Dispenser #13" are generally comparable. Following the automatic dispensing of the entire quantity of stored buns from a compartment, the shelf assembly 18 is in the lower position and is then moved to the uppermost position by an up trip switch 60. In order to load (or replenish) the compartment refill shelf 18, switch 68 is set on the manual position. This allows for manual operation of the helical element 18 by use of switch 70. If switch 70 is raised in the up position no actuation occurs because power to the motor starting contactor 72 is interrupted by the top limit switch 75. If switch 70 is depressed motor 77 operates causing the bun shelf assembly 18 to rotate and descend. Motor 77 is a portion of drive motor 30. The unit 18 is loaded generally one-third at a time by rotating it to that extent to fill empty spaces on the helical shelf. Assembly 18 is preferably again raised to its upper position before the dispensing starts.

Automatic operation of the dispenser is obtained by setting switch 68 to the automatic position. Operation of the unit automatically is as follows:

Power goes through normally closed up trip switch 60, through switch 68c of the four-pole, double-throw switch 68, through normally closed switch 91, which is a portion of photocell 53, through pole 82b, now in its lower position, to the coil of relay 72B energizing motor 77 through contacts of relay 72B causing the helical element 18 to rotate and descend. When the first roll is sensed, switch portion 91 will open. Indexing cam 49 on helical element 18 actuates switch 93 providing a shunt across now open switch 91 until a roll pocket rotates to the desired position in front of the roll pusher 43 at which time switch 93 reopens.

It should be noted that when all rolls are discharged from the helical shelf assembly 18, the helical assembly 18 will continue to rotate until it mechanically depresses up trip switch 60. The operation of up trip switch 60 has a two-fold purpose as follows:

(1) It energizes latching relay coil 82A which provides power in the proper phase through energization of motor starter 72A to motor 77 which drives the helical unit 18 in the upward direction. The helical unit will continue in motion until the top limit switch 72 is interrupted at which time an indicator lamp 75L on the roll dispenser cabinet lights. Top limit switch 72 has means (not shown) to open switch 60 when helical unit 18 reaches its upper position.

(2) It latches the changeover relay 109 removing power from roll discharge cylinder solenoid 101 of dispenser unit 12 and making power available to roll discharge cylinder solenoid 102 of dispenser unit 13 during bun demand signal.

Automatic dispensing of rolls from the silo to hamburger machine conveyor occurs in the following manner:

Demand for rolls is sensed through the closure of timing switch 96, through one of the memory switches at through contact 98A of relay 98 for silo 12 (and contact 99A of relay 99 for silo 13) to the coil of solenoid 101 or 102 depending upon which dispenser is ready to dispense at the time of demand.

For illustrative purposes let us assume dispenser 12 is in the dispense mode and a roll is in the ready position waiting to be transferred onto the conveyor 47. On arrival of the roll demand signal the following occurs:

(1) Since the bun is in ready position for transfer onto the conveyor 47, relay 98 becomes armed through the contact 103, which is a portion of photocell 53. With relay 98 armed, power is made available to the one-revolution clutch solenoid 112.

(2) Solenoid 101, which controls cylinder 34 and which is itself controlled by clutch solenoid 112, causes cylinder 34 and pusher 43 to push a bun 51 from silo 12 to conveyor 47. The bun 51 may then be conveyed through the slicer and thence to the hamburger machine described in the earlier mentioned U.S. patent application Ser. No. 220,615.

The slicing motor and slicer conveyor are operated by the closure of normally open portion 103' of photosensor switch 103.

The manual changeover from one dispenser to the other is accomplished by means of the manual changeover switch 111 located in the rear of the bun storage cabinet. In effect this switch makes power available to the latching relay 109 which in turn makes power available to 101 (or 102) depending on selection made by the manual changeover switch 111.

It will be apparent to those skilled in the art that various modifications may be made in the invention without departing from the scope of the invention. Accordingly, the invention is not to be limited except insofar as necessitated by the appended claims.

I claim:

1. An apparatus for automatically dispensing individually items comprising in combination: a vertically mounted storage compartment; a vertically mounted helical element rotatably mounted in said compartment and arranged to store items to be dispensed on the flights of said element; means to incrementally rotate and axially translate said element; a dispensing station at the base of said compartment to receive an item on said element as said element rotates and axially translates; means to sense the presence of an item at said station; transfer means for removing an item delivered to said station and to dispense it; and electrically interconnected means to actuate said transfer means and to activate said element rotating means after said transfer means has removed an item previously positioned at said station.

2. An apparatus in accordance with claim 1 wherein said means to sense the presence of an item at said station comprises a photoelectric cell.

3. An apparatus in accordance with claim 1 wherein a pair of said apparatus are employed in combination and electrically interconnected for dependent alternate operation.

4. An apparatus in accordance with claim 1 wherein said helical element comprises a plurality of segments superimposed to form a helix comprising a single continuous flight.

5. An apparatus in accordance with claim 1 wherein said transfer means comprises a pivotal arm actuated by a pneumatic cylinder.

6. An apparatus in accordance with claim 2 wherein said transfer means comprises a pivotal arm actuated by a pneumatic cylinder and wherein actuation of said cylinder is triggered by said photoelectric cell upon sensing the presence of an item at the dispensing station.

7. A dispenser comprising:
  a stator with a longitudinal axis having wall portions forming a compartment and having an opening extending therethrough into said compartment;
  a helical element with a plurality of turns disposed in said compartment at least in part and supported by said stator coaxially therewith and rotatable about and displaceable along said axis relative to said stator with each turn having a plurality of peripherally-spaced recesses for holding respective items therein;
  a step drive connecting to said element and to said stator for automatically rotating said element and for advancing said recesses one-by-one adjacent to said opening;
  a sensor mounted on said stator and coupled to said drive for automatically stopping said element when an item is disposed in the recess adjacent to said opening; and
  a transfer means coupled to said sensor to prevent actuation of said transfer when said element is rotating and mounted on said stator adjacent to said opening for dispensing said items through said opening on demand.

References Cited

UNITED STATES PATENTS

| | | | |
|---|---|---|---|
| Re. 23,103 | 4/1949 | Newcomer | 221—13 X |
| 1,038,668 | 9/1912 | Sheehan | 221—86 X |
| 1,616,824 | 2/1927 | Redlinger | 221—79 |
| 1,696,795 | 12/1928 | Cutler | 221—83 X |
| 1,767,803 | 6/1930 | Leatherman | 221—82 X |
| 2,698,659 | 1/1955 | Kosek | 198—37 X |
| 2,806,631 | 9/1957 | Van Vactor | 221—13 |
| 3,190,489 | 6/1965 | Childers et al. | 221—13 |
| 3,260,404 | 7/1966 | Critchell | 221—13 |

FOREIGN PATENTS

| | | |
|---|---|---|
| 144,287 | 11/1951 | Australia. |
| 192,714 | 9/1923 | Great Britain. |
| 1,186,674 | 2/1959 | France. |
| 40,060 | 9/1936 | Holland. |
| 304,892 | 4/1955 | Switzerland. |

SAMUEL F. COLEMAN, *Primary Examiner.*